United States Patent
Goluguri et al.

(10) Patent No.: US 10,726,642 B1
(45) Date of Patent: Jul. 28, 2020

(54) VEHICLE DATA SHARING WITH INTERESTED PARTIES

(71) Applicant: TOYOTA MOTOR NORTH AMERICA, INC., Plano, TX (US)

(72) Inventors: Jaya Bharath R. Goluguri, McKinney, TX (US); Felipe G. Salles, Garland, TX (US); Christopher J. Risberg, Flower Mound, TX (US); Joshua C. Batie, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/520,631

(22) Filed: Jul. 24, 2019

Related U.S. Application Data

(63) Continuation-in-part of application No. 16/370,325, filed on Mar. 29, 2019.

(51) Int. Cl.
| | | |
|---|---|---|
| *G07C 5/08* | (2006.01) | |
| *G07C 5/00* | (2006.01) | |
| *G06Q 20/38* | (2012.01) | |
| *G06F 16/27* | (2019.01) | |

(52) U.S. Cl.
CPC ........... *G07C 5/008* (2013.01); *G07C 5/0808* (2013.01); *G07C 5/0866* (2013.01); *G06F 16/27* (2019.01); *G06Q 20/389* (2013.01)

(58) Field of Classification Search
CPC .... G07C 5/008; G07C 5/0808; G07C 5/0866; H04W 4/38; H04W 12/02; H04L 67/22; H04L 63/0428; H04L 67/12; H04L 63/0429; H04L 63/123; H04L 63/10
USPC .... 340/425.5, 438, 471, 472; 701/29, 30, 31
See application file for complete search history.

(56) References Cited

U.S. PATENT DOCUMENTS

| | | |
|---|---|---|
| 6,853,889 B2 | 2/2005 | Cole |
| 7,236,983 B1 | 6/2007 | Nabors et al. |
| 7,415,126 B2 | 8/2008 | Breed et al. |
| 7,610,146 B2 | 10/2009 | Breed |
| 7,630,807 B2 | 12/2009 | Yoshimura et al. |
| 7,826,970 B2 | 11/2010 | Kobayashi et al. |
| 8,258,934 B2 | 9/2012 | Filev et al. |

(Continued)

FOREIGN PATENT DOCUMENTS

| | | |
|---|---|---|
| CN | 100339859 C | 9/2007 |
| CN | 101992779 B | 4/2015 |

(Continued)

OTHER PUBLICATIONS

Dahlinger et al., "Car as a Sensor Paying people for providing their car data", Research Gate, Oct. 2015.

(Continued)

*Primary Examiner* — Hung T Nguyen

(57) ABSTRACT

An example operation may include one or more of receiving, at a server, sensor data from one or more sensors disposed on a vehicle, receiving, at the server, additional sensor data from a computing device operating inside the vehicle, determining the sensor data and the additional sensor data correspond to the vehicle's operational status, determining whether one or more of the sensor data and the additional sensor data exceed one or more thresholds, and when one or more of the sensor data and the additional sensor data exceed the one or more thresholds, providing a value to the vehicle.

20 Claims, 18 Drawing Sheets

(56) References Cited

U.S. PATENT DOCUMENTS

| | | | |
|---|---|---|---|
| 8,468,057 | B2 | 6/2013 | Ross et al. |
| 8,818,725 | B2 | 8/2014 | Ricci |
| 8,831,972 | B2 | 9/2014 | Angell et al. |
| 9,092,808 | B2 | 7/2015 | Angell et al. |
| 9,429,943 | B2 | 8/2016 | Wilson et al. |
| 10,399,523 | B1 * | 9/2019 | Christensen ............ G07C 5/008 |
| 2007/0273492 | A1 | 11/2007 | Hara et al. |
| 2008/0042814 | A1 | 2/2008 | Hurwitz et al. |
| 2008/0249857 | A1 | 10/2008 | Angell et al. |
| 2012/0109692 | A1 | 5/2012 | Collins et al. |
| 2013/0054139 | A1 | 2/2013 | Bodin et al. |
| 2013/0204943 | A1 | 8/2013 | Ricci |
| 2013/0282277 | A1 | 10/2013 | Rubin et al. |
| 2013/0338914 | A1 | 12/2013 | Weiss |
| 2014/0322676 | A1 | 10/2014 | Raman |
| 2015/0309562 | A1 | 10/2015 | Shams et al. |
| 2016/0148440 | A1 * | 5/2016 | Kwak .................... G07C 5/008 701/31.5 |
| 2018/0018723 | A1 | 1/2018 | Nagla et al. |
| 2018/0091596 | A1 | 3/2018 | Alvarez et al. |
| 2018/0286145 | A1 * | 10/2018 | Lindelof ................ G07C 5/008 |
| 2018/0307859 | A1 | 10/2018 | LaFever et al. |
| 2018/0336515 | A1 | 11/2018 | Mehring et al. |
| 2018/0342036 | A1 | 11/2018 | Zachary |
| 2018/0357438 | A1 | 12/2018 | Gayton et al. |
| 2019/0073701 | A1 | 3/2019 | Sonnad et al. |
| 2019/0079659 | A1 | 3/2019 | Adenwala et al. |
| 2019/0098015 | A1 | 3/2019 | Hookham-Miller |
| 2019/0141048 | A1 | 5/2019 | Fallah et al. |
| 2019/0149598 | A1 | 5/2019 | Sawada et al. |
| 2019/0158606 | A1 | 5/2019 | Bemat et al. |
| 2019/0172057 | A1 | 6/2019 | Vincent |

FOREIGN PATENT DOCUMENTS

| | | |
|---|---|---|
| CN | 102216119 B | 9/2015 |
| CN | 104386063 B | 7/2017 |
| CN | 104870290 B | 5/2018 |
| DE | 102010013403 A1 | 11/2010 |
| EP | 0952933 B1 | 1/2005 |
| EP | 1592584 A1 | 11/2005 |
| EP | 1625040 A1 | 2/2006 |
| EP | 1661751 B1 | 1/2008 |
| EP | 1544071 B1 | 2/2008 |
| EP | 1530025 B1 | 12/2008 |
| EP | 2022027 A1 | 2/2009 |
| EP | 2098423 A1 | 9/2009 |
| EP | 1688295 B1 | 12/2009 |
| EP | 2091774 B1 | 8/2012 |
| EP | 2572327 A2 | 3/2013 |
| EP | 2752833 A1 | 7/2014 |
| EP | 1544070 B1 | 3/2016 |
| JP | 5826277 B2 | 12/2015 |
| JP | 6408382 B2 | 10/2018 |
| WO | 1994019212 A2 | 9/1994 |
| WO | 2004039631 A1 | 5/2004 |
| WO | 2004101306 A1 | 11/2004 |
| WO | 2007096308 A1 | 8/2007 |
| WO | 2010134824 A1 | 11/2010 |

OTHER PUBLICATIONS

Dahlinger et al., "The Impact of Abstract vs. Concrete Feedback Design on Behavior Insights from a Large Eco-Driving Field Experiment", CHI 2018, Apr. 21-26, 2018, Montreal, QC, Canada.

Kaiser et al., "A Research Agenda for Vehicle Information Systems", Association for Information Systems AIS Electronic Library (AISeL), ECIS 2018 Proceedings, Nov. 29, 2018.

Goluguri, Jaya Bharath R., Vehicle Data Sharing With Interested Parties, U.S. Appl. No. 16/370,325, filed Mar. 29, 2019.

Goluguri et al., Vehicle Data Sharing With Interested Parties:, U.S. Appl. No. 16/370,325, filed Mar. 29, 2019.

Goluguri et al., U.S. Appl. No. 16/370,278, filed Mar. 29, 2019.

Non Final Office Action dated Dec. 2, 2019, issued in the parent U.S. Appl. No. 16/370,325.

* cited by examiner

250

600

VEHICLE DATA SHARING WITH INTERESTED PARTIES

FIELD

This application generally relates to vehicle data sharing, and more particularly, to vehicle data sharing with interested parties.

BACKGROUND

Transports, such as cars, motorcycles, trucks, planes, trains, etc., are experiencing varying conditions as they are being utilized, such as road conditions, traffic patterns, performance of other vehicles, vehicle conditions, safety conditions, weather conditions, etc. Other types of data, which may be identified from the interior and/or exterior of a vehicle, include user actions, such as entertainment selections, navigation information, tire pressure, etc.

Such data may be stored in a database which maintains data in a single database at one particular location. This location is often a central computer, for example, a desktop central processing unit (CPU). Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a failure occurs (for example a hardware, firmware, and/or a software failure), all data within the database is lost and work of all users is interrupted. Furthermore, because a database storage system has minimal to no data redundancy, data that is unexpectedly lost is very difficult to retrieve other than through manual operation from back-up storage. Conventionally, a centralized database is limited by its ability to prevent fraudulent claims made by entities attempting to submit multiple claims for a single occurrence. Information that is important, such as access permissions and private user data may require further data management infrastructure and procedures to ensure privacy and consent to share such data is preserved.

SUMMARY

One example embodiment may provide a system, comprising one or more of at least one sensor on a transport, and a server that stores a privacy setting for data associated with the at least one sensor wherein, based on the privacy setting, data is collected and transmitted from the at least one sensor to the server, wherein the privacy setting is associated with an anonymity of a user associated with the transport and with the data, wherein the data is used by the server to complete an action, wherein the server provides a value to the transport based on a result of the action.

Another example embodiment may provide a method, comprising one or more of storing a privacy setting for data associated with at least one sensor on a transport, collecting data based on the privacy setting associated with the at least one sensor, transmitting the data to a server, wherein the privacy setting is associated with an anonymity of a user with the transport and with the data, completing an action at the server using the data, and providing, at the server, a value to the transport based on the result of the action.

A further example embodiment may provide a non-transitory computer readable medium comprising instructions, that when read by a processor, cause the processor to perform one or more of storing a privacy setting for data associated with at least one sensor on a transport, collecting data based on the privacy setting associated with the at least one sensor, transmitting the data to a server, wherein the privacy setting is associated with an anonymity of a user with the transport and with the data, completing an action at the server using the data, and providing, at the server, a value to the transport based on the result of the action.

Yet a further example embodiment may provide a system comprising a server configured to perform one or more of assign sensor data from a transport to one or more categories based on sensor data share permissions stored in a profile associated with a transport, send the sensor data to one or more recipients based on the one or more categories, and provide a value to the transport by the one or more recipients based on the sensor data via a smart contract which references the sensor data sent to the one or more recipients, the value being provided to the transport, a date associated with the sent sensor data, and a date associated with the provided value.

Yet a further example embodiment may provide a method comprising one or more of assigning sensor data from a transport to one or more categories based on sensor data share permissions stored in a profile associated with a transport, sending the sensor data to one or more recipients based on the one or more categories, and providing a value to the transport by the one or more recipients based on the sensor data via a smart contract which references the sensor data sent to the one or more recipients, the value being provided to the transport, a date associated with the sent sensor data, and a date associated with the provided value.

Yet a further example embodiment may provide a non-transitory computer readable medium comprising instructions, that when read by a processor, cause the processor to perform one or more of assigning sensor data from a transport to one or more categories based on sensor data share permissions stored in a profile associated with a transport, sending the sensor data to one or more recipients based on the one or more categories, and providing a value to the transport by the one or more recipients based on the sensor data via a smart contract which references the sensor data sent to the one or more recipients, the value being provided to the transport, a date associated with the sent sensor data, and a date associated with the provided value.

Still yet another example embodiment may provide a method that includes one or more of receiving, at a server, sensor data from one or more sensors disposed on a vehicle, receiving, at the server, additional sensor data from a computing device operating inside the vehicle, determining the sensor data and the additional sensor data correspond to the vehicle's operational status, determining whether one or more of the sensor data and the additional sensor data exceed one or more thresholds, and when one or more of the sensor data and the additional sensor data exceed the one or more thresholds, providing a value to the vehicle.

Yet another example embodiment may provide a system that includes a vehicle, a computing device operating inside the vehicle, and a server configured to perform one or more of receive sensor data from one or more sensors disposed on the vehicle, receive additional sensor data from the computing device operating inside the vehicle, determine the sensor data and the additional sensor data correspond to the vehicle's operational status, determine whether one or more of the sensor data and the additional sensor data exceed one or more thresholds, and when one or more of the sensor data and the additional sensor data exceed the one or more thresholds, provide a value to the vehicle.

Still yet another example embodiment may provide a non-transitory computer readable storage medium configured to store instructions that when executed cause a processor to perform one or more of receiving, at a server, sensor data from one or more sensors disposed on a vehicle, receiving, at the server, additional sensor data from a computing device operating inside the vehicle, determining the sensor data and the additional sensor data correspond to the vehicle's operational status, determining whether one or more of the sensor data and the additional sensor data exceed one or more thresholds, and when one or more of the sensor data and the additional sensor data exceed the one or more thresholds, providing a value to the vehicle.

DETAILED DESCRIPTION

Figure 1A:
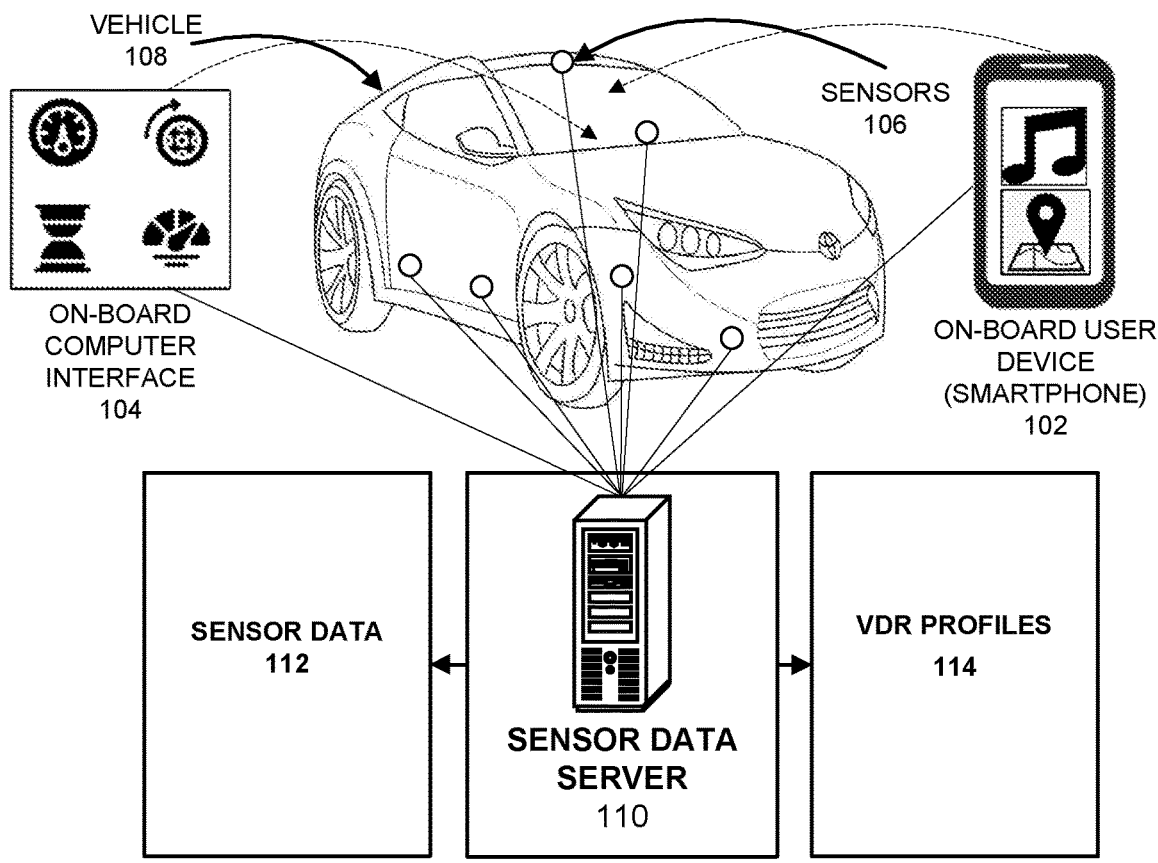
FIG. 1A illustrates a diagram of a transport sensor data collection system, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a transport (also referred to as a vehicle herein) sensor data collection and verification system and vehicle data distribution configuration. The sensor data received in the form of communication update messages, such as wireless data network communications and/or wired communication messages, may be received and processed to identify user vehicle profile permissions, interested third parties registered to receive such data and other processing components which identify and interpret the sensor data received.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for vehicle sensor information to be controlled by a permission granting entity and thus in a "decentralized" manner, such as via a blockchain membership group. Each interested party (i.e., driver, company, agency, etc.) may want to limit the exposure of private information, and therefore the blockchain and its immutability can limit the exposure and manage permissions for each particular user vehicle profile. A smart contract may be used to provide compensation, permission determination and distribution to entities seeking access to such vehicle sensor data (or vehicle sensor information). Also, if fraud is detected, the necessary information can be shared among the entities based on a "consensus" approach associated with the blockchain. Such an approach could not be implemented on a traditional centralized database. Although, each company has its own independent information system, then it is not practical to assume that this blockchain-based approach could be implemented on a centralized system, since the consensus mechanism of the blockchain is used to share information when permission is required.

FIG. 1A illustrates a network diagram of a vehicle sensor data collection system, according to example embodiments. Referring to FIG. 1A, the network 100 includes one or more vehicles including sensors to collect sensor data. In this example, a vehicle 108 is illustrated with various sensors 106, which may be installed during manufacturing or in an after-market capacity. The sensors 106 can detect vehicle related data as well as environmental and road related data which may include a plurality of different sensor data sets collected from a plurality of different sensor types and one or more computing devices. The sensor data is uploaded to or retrieved by a sensor data server 110 which may process the sensor data 112 and identify vehicle data recipient (VDR) profiles 114 to pair with the sensor data for analytical or distribution purposes. In one embodiment, a recipient may include any device comprising a processor and memory such as a client, a server, a P.C., a laptop, a mobile phone, a smart watch, etc. In another embodiment, the recipient may include one or more users which may be associated with a device comprising a processor and memory.

The sensors 106 may be affixed to any part of the vehicle 108 and may be on the exterior and/or the interior of the vehicle 108. The sensors may be hardwired to a central controller of the vehicle or may be in wireless communication with a central controller of the vehicle's computer via communication protocols such as BLUETOOTH, IEEE standards, RFID, NFC and/or other protocols and configurations. The data may be transmitted from the computer's central computer unit, such as an on-board computer, a user's smartphone, a cellular compatible device, etc. The data may be sent via a cellular communication network via a SIM card or other module installed in the vehicle. The sensor content may include one or more of an action taken inside the vehicle, an action taken outside the vehicle, and an action taken by the vehicle such as radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc.

The types of sensors 106 include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors.

In an effort to create an incentive for autonomous-vehicle owners and/or operator driven vehicles to share the data collected by their vehicles' sensors, certain VDRs may be willing to offer an incentive to those owners and/or operators which are authorized to share the data and are willing to consent to sharing such vehicle sensor data. The data shared may be for a one type of data or multiple types of data, for a one-time use, multiple use and/or persistent use. As a vehicle collects sensor data from the sensor(s) 106 or via user computer devices and on-board computing device 102 and 104, the data can be collected and distributed in raw form or can be collected and organized by sensor type and/or data type prior to distribution. For purposes of this example, the sensor data 112, may be organized according to the device which produced the sensor data. Also, the computer selections may be deemed sensor data, when in fact the content of the data may be user submitted actions, such as infotainment selections, which may not be explicitly from a "sensor" but may be recorded and submitted with the sensor data 112, to the sensor server 110. The managerial entity responsible for managing the sensor data server 110 may be the vehicle owner and/or operator or a third party which manages the sensor data and the VDR profile accounts 114. In operation, the VDR profiles 114 may identify certain sensor data which those VDRs are registered to receive. The sensor data may identify a sensor by its type, identifier, manufacturer, etc. Another example may include a token exchange system for receiving sensor data and providing a credit for such data. The particular tokens employed could be specific to a particular blockchain or could be in the form of a cryptocurrency. Other kinds of credit or digital values could also be provided to the vehicle owner (and/or operator) in exchange for the shared vehicle sensor data. In one example, a vehicle owner can elect to divert the received value to an entity. As data sets of sensor data accumulate, the data may be categorized, such as traffic data (i.e., sensors identifying traffic and traffic patterns), roadway data (i.e., sensors identifying road conditions), location data (i.e., sensors identifying vehicle locations and navigation routes), personal use data (i.e., sensors identifying user activities and selections), etc. A vehicle owner and/or operator could offer each block of his or her vehicle sensors data for a specified amount of a cryptocurrency or other types of value. In other embodiments, a vehicle passenger, that controls a device capable of communicating with the sensor data server, can perform a similar function and receive value for doing so. In further embodiments, the transport itself can receive the full (or partial) value.

The data can be stored in a blockchain that exists on the vehicle 108, on the server 110 and/or in a cloud network. The blockchain can also facilitate the management of the values provided in return for data access, whether in a conventional manner or via tokens or other types of reward. In one example, the vehicle 108 offloads its sensor data 112 to the cloud over a wireless communication network (e.g., cellular network). The data is added to a blockchain but remains under the control of the vehicle owner until the vehicle owner decides to share some or all of the data. The conditions may be outlined in a smart contract which is used by the shared ledger to perform the management of the data including sharing, crediting and distribution of data.

Figure 1B:
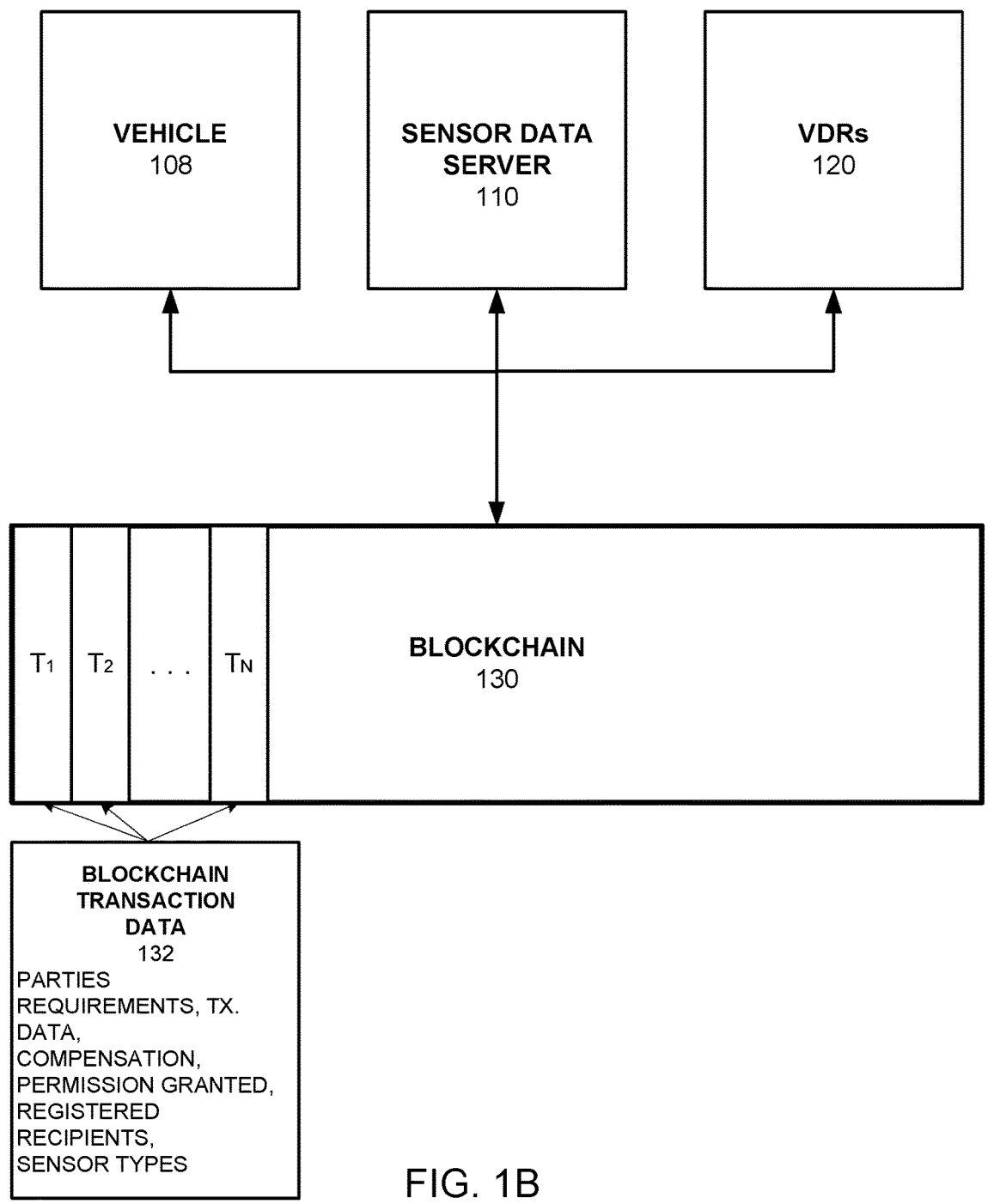
FIG. 1B illustrates a diagram of a transport sensor data collection system utilizing a distributed ledger, according to example embodiments.

FIG. 1B illustrates a diagram of a vehicle sensor data collection system 150 utilizing a shared ledger, according to example embodiments. Referring to FIG. 1B, the system 150 includes a vehicle 108, which generates and/or receives sensor data and forwards the sensor data to a sensor data server 110 which maintains profiles of vehicle owners and VDRs 120 seeking access to the data. The blockchain 130 is provided as a member data platform that identifies the data being collected, shared and transferred to third parties and logs the instances of such transfers via individual blockchain transactions 132. In other embodiments, the data is placed in the blockchain after it has been identified. Content of a transaction may include the parties involved in a transaction, terms, dates, times, types of data, compensation provided, permissions confirmed, vehicle information including the sensor types and the sensor data categories, etc. The shared ledger logs the transferred data instances in the form of transactions 132 for subsequent audits and other interested parties seeking to identify the transaction validity and confirm the existence of a data sharing event.

Figure 1C:
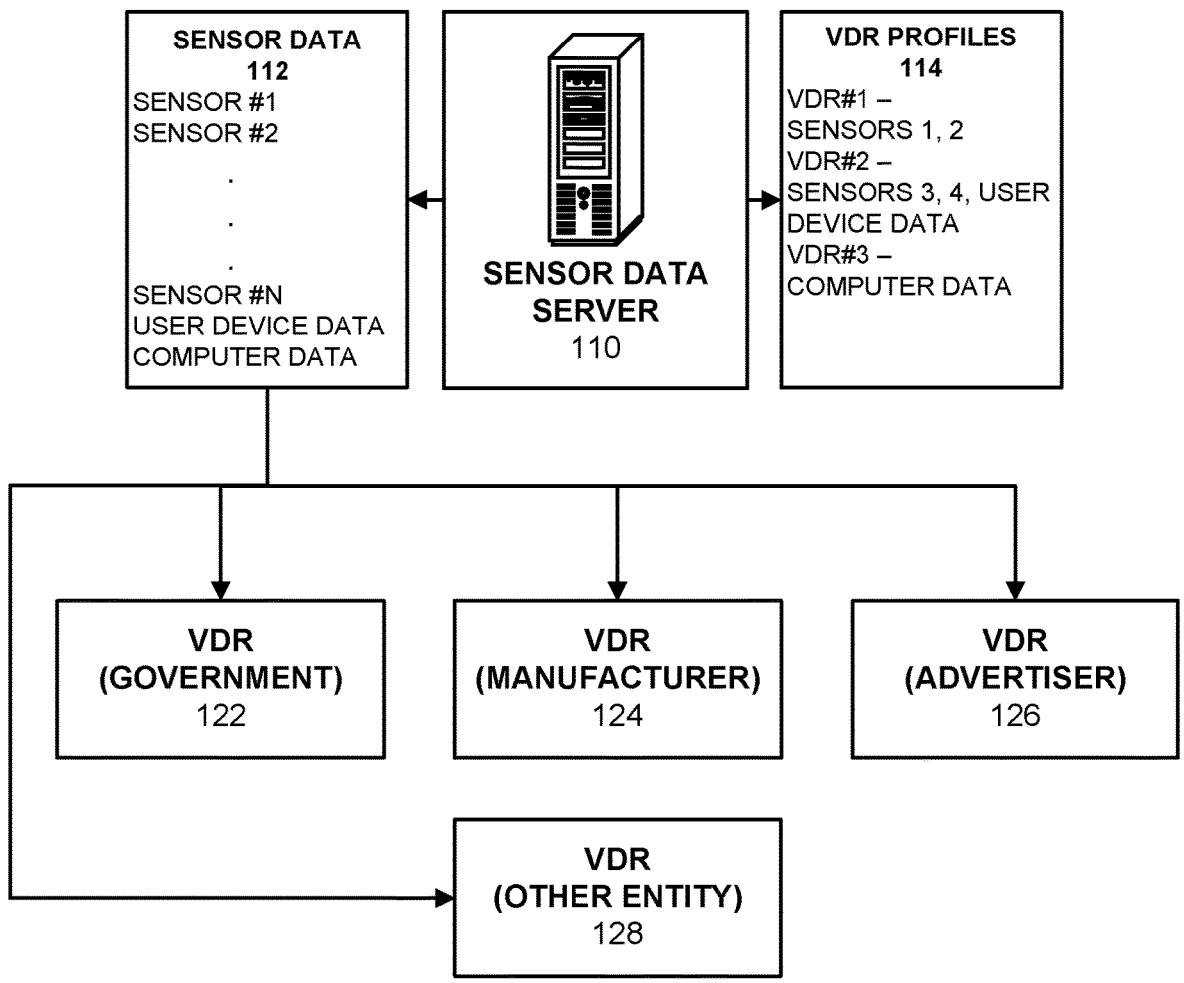
FIG. 1C illustrates a diagram of vehicle sensor data being processed and distributed to interested third parties, according to example embodiments.

FIG. 1C illustrates a system 170 in which vehicle sensor data is processed and distributed to interested third parties, according to example embodiments. Referring to FIG. 1C, the system 170 includes the sensor data server 110 receiving and processing data from the sensors 106. The sensor data 112, may be categorized based on its sensor type, whether it was a vehicle computer which collected the data, or whether it was a user device that collected the data, all of which are viable sensors. In other embodiments, the sensor data 112 can include non-vehicle-based sensor data which can be stored independently or in conjunction with data from the vehicle-based sensors 106. For example, fixed sensors on a side of a road and/or mobile sensors from other vehicles, can emit data that can be stored independently or in conjunction with the data from the sensors 106 The plurality of different sensor data sets can be assigned to different ones of the registered categories, and the one or more vehicle data recipients may include a plurality of different vehicle data recipients (VDRs) with corresponding different ones of the registered categories assigned to them, for example, to their respective data recipient profiles. In operation, the VDR profiles 114 may identify certain sensor data which those VDRs are registered to receive. For example, a VDR may include a government agency 122 seeking road condition information, which may be detected by video sensor data or accelerometer sensor data to identify movement on the road, etc. Another VDR may be a manufacturer 124, which is seeking sensor data that identifies vehicle operation, such as engine, tires, brakes, acceleration, etc. The manufacturer VDR 124 may be seeking to identify sensor data for a particular vehicle type and via certain vehicle sensors 106 collected as part of a collective set of sensor data 112. Another VDR may be an advertiser 126, which is seeking to identify a user profile of the vehicle, such as the age of the driver, the radio station or program he/she listens to, the activities conducted by the driver, the navigation used, and locations frequented by the vehicle and its operator. Also, other VDRs 128 may be interested in the sensor data to identify whether to select certain advertisements, provide feedback to others, control the user of the car, especially in the event that the car is an autonomous vehicle.

Autonomous vehicles may be regulated where sensor data is mandated for various reasons since operation of the vehicle is controlled by a computer and not necessarily a person. As a result, the sharing of the sensor data gathered by autonomous vehicles may be required by various agencies and third parties to ensure safety measures. The vehicle 108 may be a vehicle operated by a human driver or an autonomous vehicle operated by a computer and/or a remote agent. The vehicle sensor data may be collected via a plurality of the vehicle sensors 106. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 . . . Sn, among sensors 106, may generate sensor data sets SD1, SD2, SD3 . . . SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, etc. The VDRs may be registered to receive certain vehicle sensor data sets depending on the interests of the particular VDRs.

Owners of autonomous/non-autonomous vehicles (or occupants of the vehicles) may register their profiles in a shared ledger or other data management system so the information collected during sensor collection efforts may be shared and the owner's profile and/or vehicle may be credited with a predetermined value also identified in the shared ledger, via a smart contract. The smart contract may identify the parties of the agreement, permissions to share data, types of data sought by the VDR(s), compensation for the data and other parameters.

In one example, a third-party seeking access to the vehicle sensor data may be a car manufacturer. In another example, the gathered sensor data could include traffic volume/pattern information, such as a number of cars that pass a particular intersection, car speeds on certain roadways, etc., gathered from a population of vehicles and aggregated into sensor data sets, such data may be desired by certain municipalities. Also, other types of private data may be exchanged for some type of benefit/credit. For example, for sharing data with a manufacturer, the vehicle may be eligible for a credit (monetary or non-monetary), identified via the smart contract and recorded in the shared ledger. The credit may be offered by the manufacturer and may include a service update. For example, an autonomous vehicle may receive a free oil change and may navigate to the manufacturer dealer for the service. As the vehicle arrives, the credit is identified from a transaction in the shared ledger, as the service is redeemed, another transaction may be written to redeem the value owned by the vehicle profile. In this manner, the vehicle receives the credit and not the owner and/or occupant. In other embodiments, the credit can be divided among one or more vehicles, owners and/or occupants.

Figure 1D:
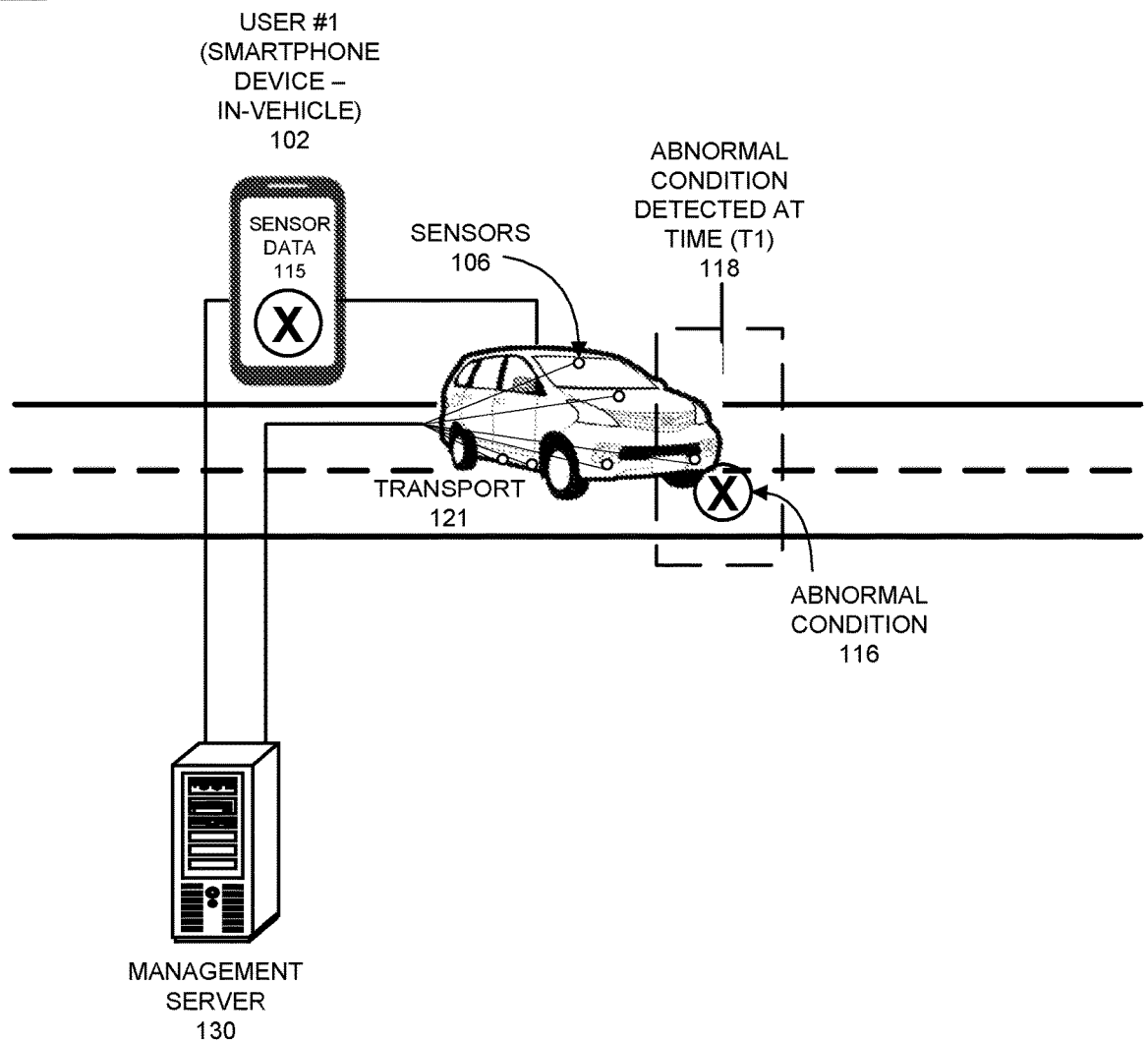
FIG. 1D illustrates a dual sensor configuration with sensor event monitoring conducted by the vehicle and the mobile device, according to example embodiments.

FIG. 1D illustrates a dual sensor configuration with sensor event monitoring conducted by the vehicle and the mobile device, according to example embodiments. Referring to FIG. 1D, in this configuration 190, a vehicle event may include a travel path along a roadway for a particular distance and/or amount of time. As the vehicle/transport 121 identifies certain conditions, such as an abnormal condition 116 (e.g., pothole, uneven roadway, fallen tree, abandoned vehicle, etc.), or any unexpected condition, then the vehicle sensors may identify the condition via any of the sensors included in the vehicle. The vehicle sensor data may be timestamped to identify the sensor data and a time 118 (T1) the condition was detected. Any vehicle sensor collected sensor data may be stored in a temporary sensor profile. In the vehicle, a sensor data collection may also be performed by a user device 102. The sensor data collected by the mobile device 115 may also be stored in another temporary sensor profile. The mobile device 115 may only be able to collect certain types of sensor data, such as accelerometer data, gyroscope data, velocity data, and changes to those data sets at a particular time, such as T1 118. The data from the mobile device 102 and the vehicle 121 may be compared and/or combined to create a sensor data set that can be shared with interested third parties that are seeking access to road conditions.

The data may be centrally managed by a server 130, which may receive the sensor data from one or more sensors disposed on a vehicle and one or more mobile devices operating inside the vehicle. The mobile device(s) may be a computing device that provides additional sensor data from what is detected inside the vehicle. The method may also include determining the sensor data and the additional sensor data correspond to the vehicle's operational status, such as sensor data capture while the vehicle is moving, and which indicates something abnormal has occurred. In order to verify the sensor data is outside the expected types of sensor data, the server 130 may perform a screening operation to determine whether one or more of the vehicle sensor data and the additional sensor data form the mobile device exceeds one or more thresholds. For example, if the vehicle experiences a large vertical and/or horizontal movement or a lateral movement, or a collision is detected, etc., the data may exceed an expected threshold range. The vehicle operation thresholds used to ascertain changes may be stored in memory via the management server 130. When the sensor data of the vehicle and/or the mobile device exceed those thresholds, the sensor data may be deemed relevant. As a result, the sensor data may be shared and when the third party has selected to use such data for an analysis of testing road conditions, the vehicle which provided that data may be identified and credited with a value for releasing such data.

When processing the sensor data, the process may include determining the sensor data has identified an abnormal movement of the vehicle while the vehicle is being operated, determining the additional sensor data has identified the abnormal movement of the vehicle and comparing a time the sensor data was captured and a time the additional sensor data was captured, and when the time the sensor data was captured and the time the additional sensor data was captured are within a predefined time range of one another (e.g., 1 second, 0.1 second, etc.), then the sensor data and the additional sensor data corresponding to the vehicle's operational status may be designated as relevant. The process may also include determining the sensor data and the additional sensor data correspond to the vehicle's operational status by determining the sensor data has identified an abnormal condition of the vehicle while the vehicle is being operated, determining the additional sensor data has identified the abnormal condition of the vehicle, and comparing a magnitude of the sensor data and a magnitude of the additional sensor data, and when the magnitude of the sensor data and the magnitude of the additional sensor are within a predefined range of one another, designating the sensor data and the additional sensor data correspond to the vehicle's operational status. The time and magnitude may both be compared since the condition may be identified at the same time, however, one sensor may have erroneously identified a false-positive and the second sensor data set from the mobile device may be used as a second sensor data set to prove the existence of the detected condition. In one example, the vehicle sensor data is one or more of movement data, audio data, and video data, and the additional sensor data from the mobile device is one or more of orientation data, angular velocity, location, speed, and direction data. Also, the one or more sensors may include movement sensors, sonar sensors, accelerometers, temperature sensors, speed sensors, sound sensors, collision sensors, tire pressure sensors, location determination sensors, camera sensors, activity sensors, and biometric sensors.

Figure 2A:
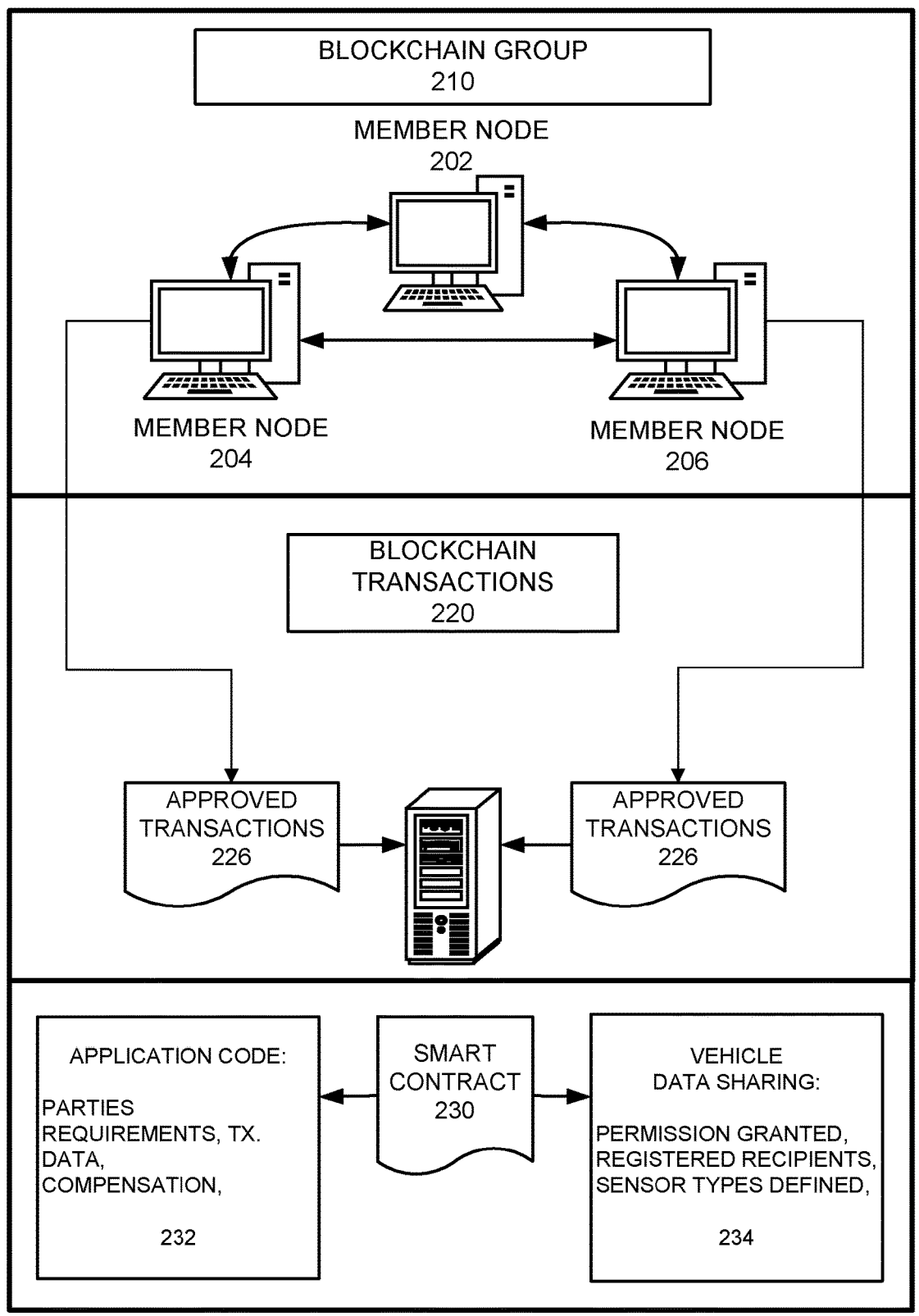
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a permissioned blockchain group 210. The permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of one or more computers as the transactions are received and approved by the consensus model dictated by the member nodes. Approved transactions 226 are stored in current blocks of the blockchain and committed to the blockchain via a committal procedure which includes performing a hash of the data contents of the transactions in a current block and referencing a previous hash of a previous block. Smart contracts 230, which are a part of the blockchain or may be accessed vis the blockchain, are configured to define the terms of transaction agreements and actions included in the smart contract executable application code 232. The vehicle sensor data may be based on vehicle data sharing agreements to include permissions granted to share vehicle sensor data, registered parties to receive the data, and types of sensor data to share, etc., 234. In other embodiments, a permissionless blockchain configuration can be used with similar results (i.e. in one embodiment, a transport being provided a value).

Figure 2B:
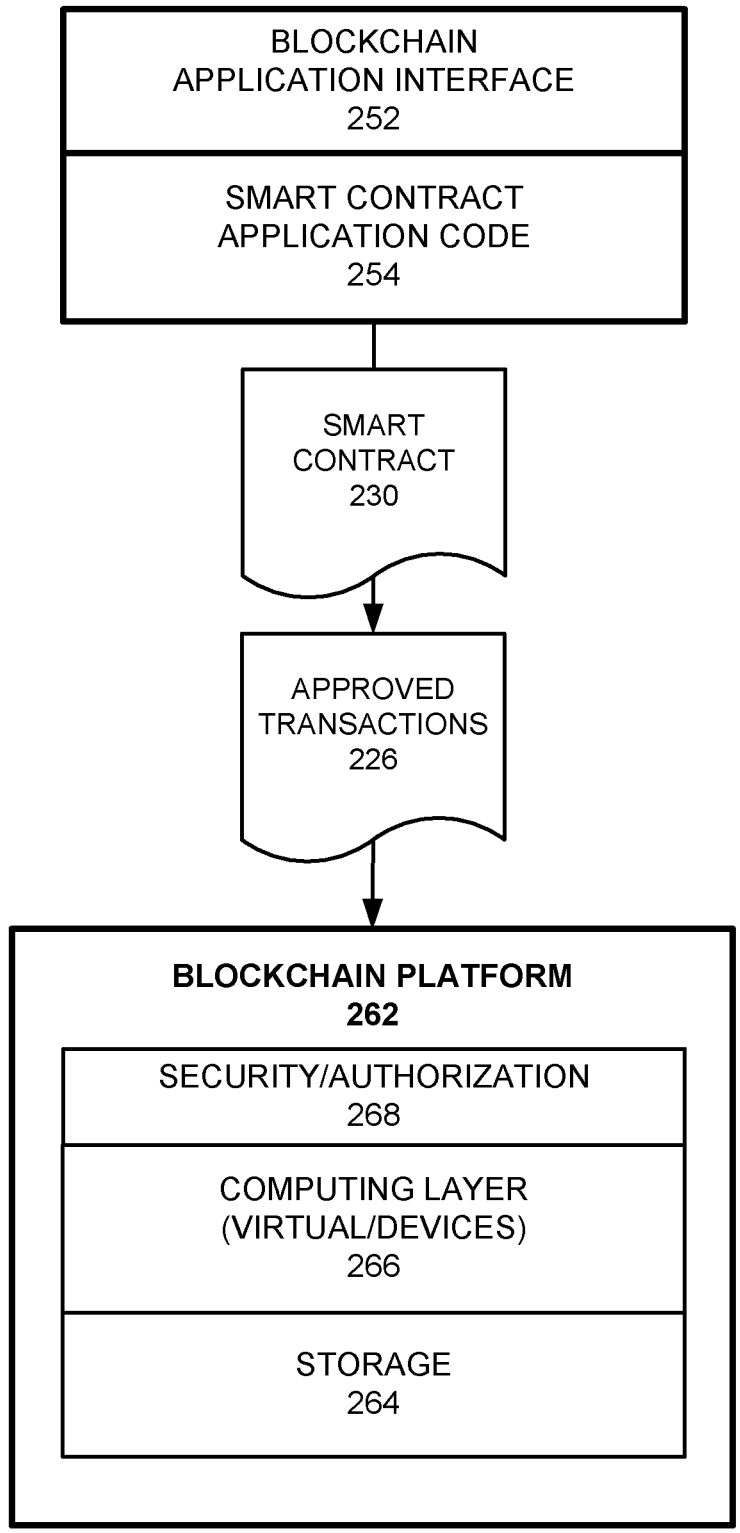
FIG. 2B illustrates a distributed ledger configuration, according to example embodiments.

FIG. 2B illustrates a shared ledger configuration, according to example embodiments. Referring to FIG. 2B, the blockchain logic example 250 includes a blockchain application interface 252 as an API, plug-in application or software that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a configuration sought by participants and can maintain their own state, control their own assets, and receive external information. This can be deployed as an entry and installed, by appending to the distributed ledger, on all blockchain nodes.

The smart contract application code 254 provides a basis for blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268 portion, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, payments and/or other notifications subject to the changes, updates, etc. The smart contracts can themselves be used to identify rules associated with authorization and access requirements and usage of the ledger. For example, the information may include a new entry claim, which may be processed by one or more processing entities (e.g., processors, virtual machines, etc.) included in the blockchain layer. The result may include a decision to reject or approve the claim based on the criteria defined in the smart contract and/or a consensus of the peers. The physical infrastructure may be utilized to retrieve any of the data or information described herein.

Within smart contract executable code, a smart contract may be created via an application and programming language and written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

Smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3:
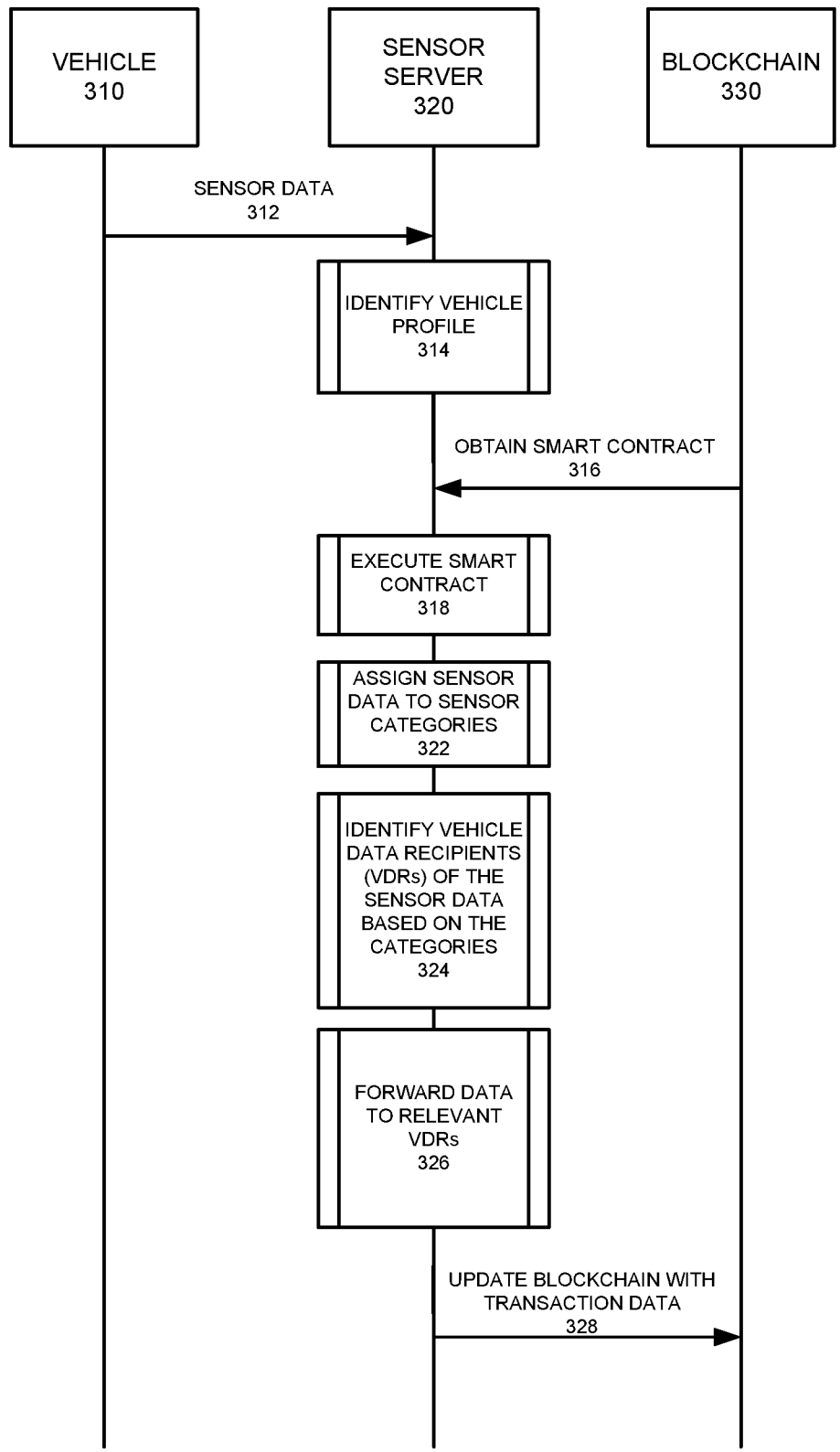
FIG. 3 illustrates a message diagram of a transport sensor data collection system, according to example embodiments.

FIG. 3 illustrates a system messaging diagram of a vehicle sensor data collection and verification system configuration, according to example embodiments. Referring to FIG. 3, the system 300 provides a vehicle 310 which offers sensor data to a sensor server 320. The data may be sent via a wired and/or wireless connection such as a link to a wireless network, such as a mobile device, a cellular computing model installed in the vehicle, a WIFI or Bluetooth module which enacts a transfer when connected and/or near a network, etc. The sensor data 312 is sent to the server 320 and the vehicle profile is identified 314, smart contract information may be provided 316 from a blockchain 330 to engage the vehicle sensor data categorization, VDR identification, and data sharing for example. The smart contract terms 318 may be identified and executed to assign sensor data to certain sensor categories 322. The categories are cross-referenced with VDR profiles to identify the sensor data of interest 324. The matched profiles are then forwarded the relevant and requested vehicle sensor data 326. The terms of the smart contract and related information are updated in a blockchain transaction 328 to identify the actions and results of the data sharing event.

Figure 4A:
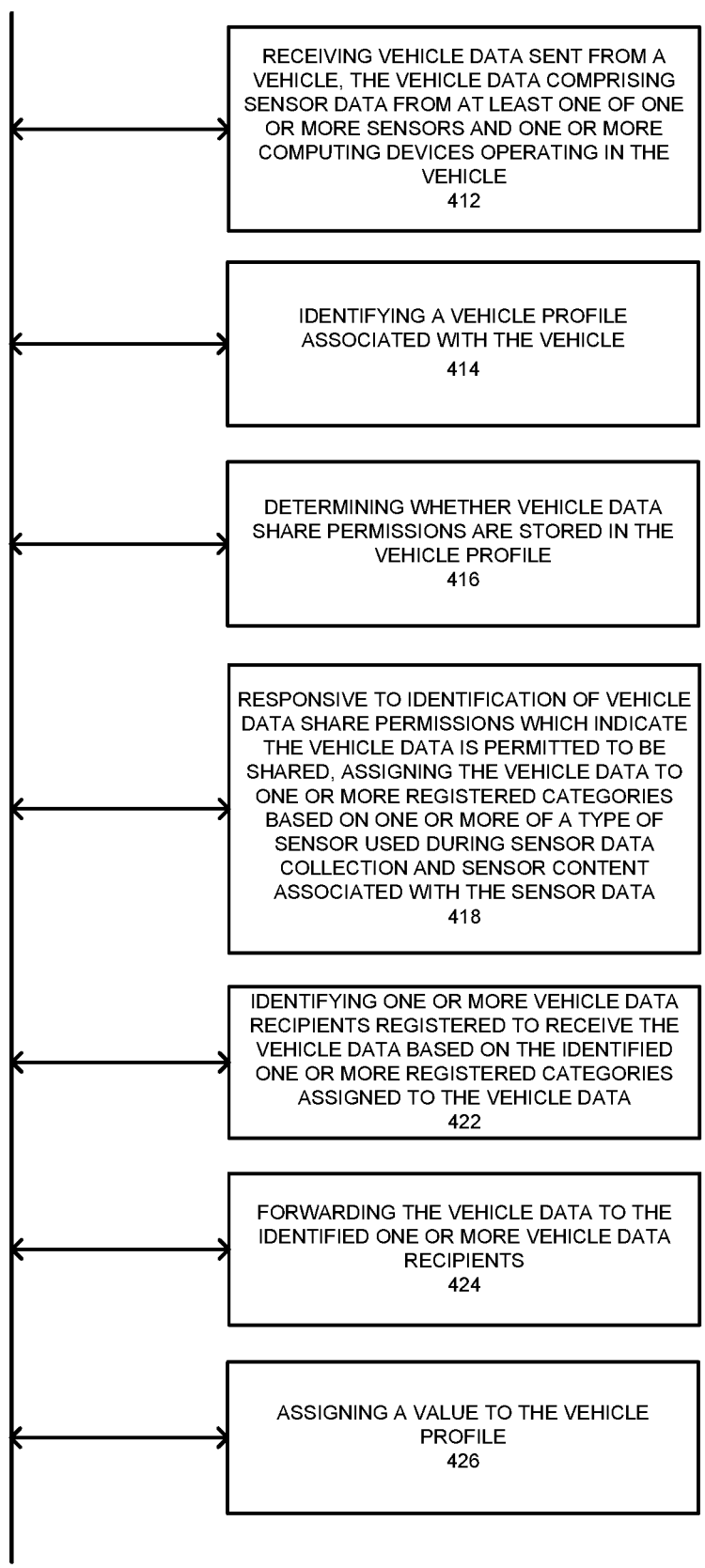
FIG. 4A illustrates a flow diagram of a transport sensor data collection process, according to example embodiments.

FIG. 4A illustrates a flow diagram of a vehicle sensor data collection process, according to example embodiments. Referring to FIG. 4A, the process 400 provides one or more of receiving vehicle data sent from a vehicle, the vehicle data including sensor data from at least one of one or more sensors and one or more computing devices operating in the vehicle 412, identifying a vehicle profile associated with the vehicle 414, determining whether vehicle data share permissions are stored in the vehicle profile 416, responsive to identification of vehicle data share permissions, which indicate the vehicle data is permitted to be shared, assigning the vehicle data to one or more registered categories based on one or more of a type of sensor used during sensor data collection and sensor content associated with the sensor data 418, identifying one or more vehicle data recipients registered to receive the vehicle data based on the identified one or more registered categories assigned to the vehicle data 422, forwarding the vehicle data to the identified one or more vehicle data recipients 424, and assigning a value to the vehicle profile 426.

A configuration to permit sensor data management may include one or more computing devices, and a vehicle with one or more sensors. A server can also be configured to perform one or more of the following in various order: receive vehicle data sent from the vehicle, the vehicle data comprising sensor data from at least one of the one or more sensors and one or more computing devices operating in the vehicle, identify a vehicle profile associated with the vehicle, determine whether vehicle data share permissions are stored in the vehicle profile, responsive to identification of vehicle data share permissions which indicate the vehicle data is permitted to be shared, assign the vehicle data to one or more registered, categories based on one or more of a type of sensor used during sensor data collection and sensor content associated with the sensor data, identify one or more vehicle data recipients registered to receive the vehicle data based on the identified one or more registered categories assigned to the vehicle data, forward the vehicle data to the identified one or more vehicle data recipients, and assign a value to the vehicle profile.

In one embodiment, the one or more vehicle data recipients registered to receive the vehicle data are identified based on the one or more registered categories assigned to the vehicle data being identified in corresponding data recipient profiles of the one or more data recipients. In other embodiments, the vehicle data recipients may receive the vehicle data on a one-time basis or an intermittent basis apart from any category and/or profile. In one embodiment, the vehicle data comprises a plurality of different sensor data sets collected from a plurality of different sensor types and one or more computing devices. The plurality of different sensor data sets are assigned to different ones of the registered categories, and the one or more vehicle data recipients include a plurality of different vehicle data recipients with corresponding different ones of the registered categories assigned to their respective data recipient profiles. The sensor content is based on one or more of an action taken inside the transport, an action taken outside the transport, and an action taken by the transport such as a radio station selection, recorded audio, mobile device usage within the vehicle, telephone calls conducted inside the vehicle, mobile data usage conducted inside the vehicle, browser history of at least one of the computing devices, purchases conducted via the at least one of the computing devices inside the vehicle, audio recorded inside the vehicle, etc. A type of sensor used during data collection comprises one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors.

In one embodiment, a system may include a distributed ledger stored in memory and a smart contract stored in the distributed ledger that is invoked responsive to the vehicle data being identified as being associated with vehicle data shared permissions. The smart contract includes at least one of a portion of the vehicle profile information, the data recipient profiles, a type of vehicle data associated with the data recipient profiles, and the value assigned to the vehicle profile based on the vehicle data being shared. The smart contract invocation results in a transaction being performed which comprises at least one of the vehicle data being shared with the one or more vehicle data recipients, the value being assigned to the vehicle profile, a date being assigned to the transaction, and the transaction being logged in the distributed ledger.

Figure 4B:
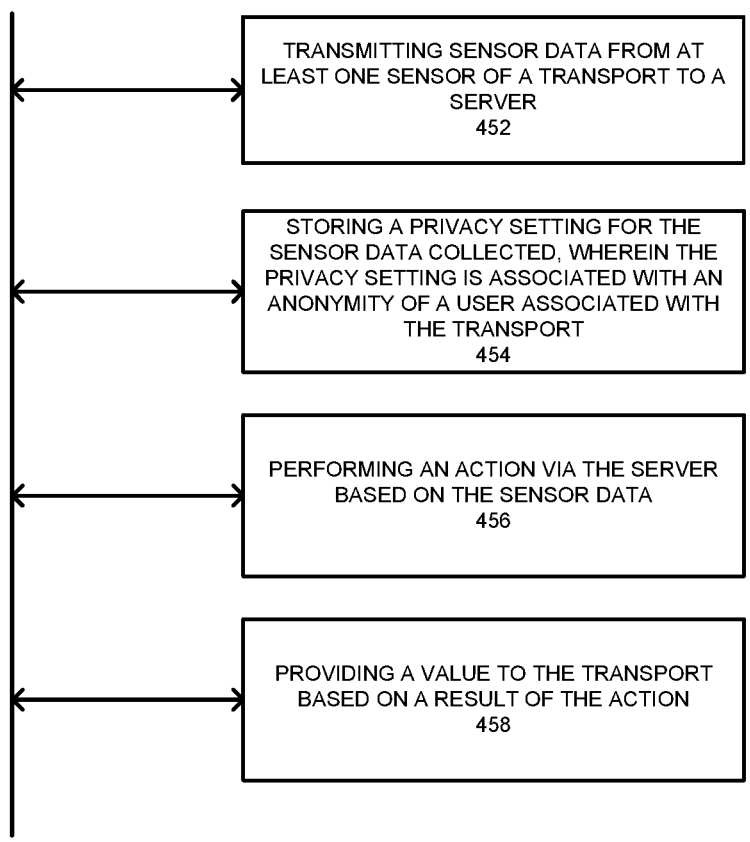
FIG. 4B illustrates a further flow diagram of a transport sensor data collection process, according to example embodiments.

FIG. 4B illustrates a further flow diagram of a vehicle sensor data collection process, according to example embodiments. Referring to FIG. 4B, the process 450 includes one or more of transmitting sensor data from at least one sensor of a transport to a server 452, storing a privacy setting for the sensor data collected, wherein the privacy setting is associated with an anonymity of a user associated with the transport 454, performing an action via the server based on the sensor data 456, and providing a value to the transport based on a result of the action 458. The transport profile may be credited with the value in response to sharing the vehicle sensor data. In other embodiments, a repository on the transport and/or off the transport but accessible by the transport may be credited with the value (prior to the data being shared, in real-time or near-real time as the data is being accumulated, and/or after the data is shared). In yet other embodiments, the value may be split among different repositories including repositories on other transports (or may fully be transferred to another transport). Based on the level of anonymity of the user associated with the data the user is producing and/or consuming, the value can be adjusted (i.e. increased or decreased). The more anonymous the data, the lower the value provided to the transport 108. The less anonymous the data, the higher the value provided to the transport 108. In one embodiment, a plurality of different data is collected by a plurality of different sensors, wherein each of the data can be more anonymous and/or less anonymous and can dynamically change. For example, during a trip, location data of the transport and/or a device used by the user, can be collected and provided to the server. The server can provide the location data, in addition to other sensor data, to an entity leading to a higher value provided to the transport. During the same trip, at a different instance, the server may not be permitted to provide the location data (based on the privacy setting), leading to a lower value provided to the transport. As such, the value provided to the transport for a single type of data, such as location-based data, can dynamically change based on the privacy setting of the user during a single trip. In another embodiment, the amount of value provided to the transport can be bifurcated based on the portion of the trip that included the location data and the portion of the trip that did not include the location data. This bifurcated data can be presented to the occupant, driver, operator and/or owner of the transport.

Also, the same information can have a different value—if a gas tank is full or batteries are fully charged, low value applied to location information but if gas tank or batteries are empty then location information is worth a lot more to a VDR/advertiser that is a gas station or charging station.

Figure 4C:
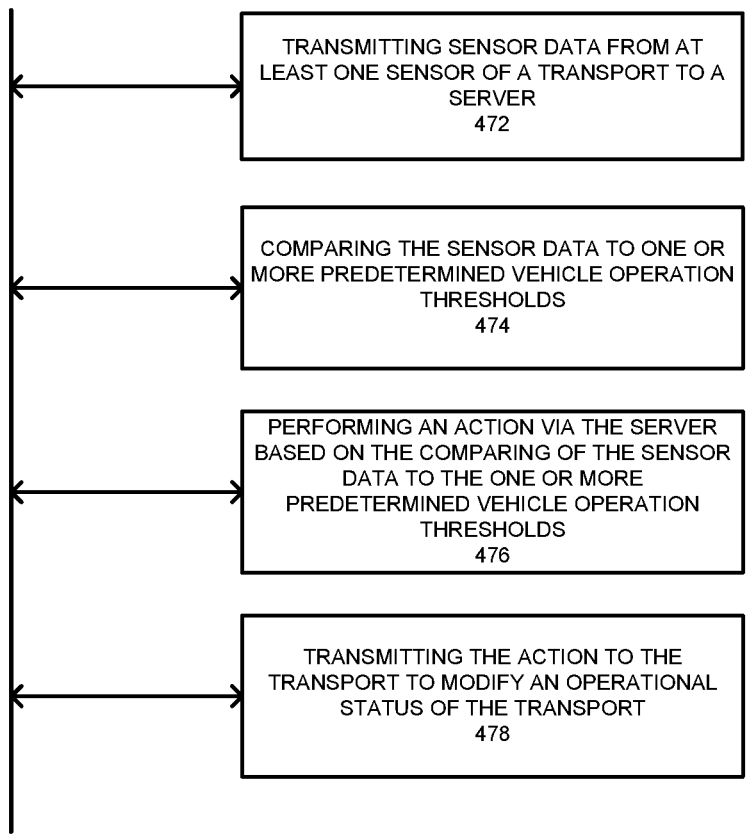
FIG. 4C illustrates another flow diagram of a transport sensor data collection process, according to example embodiments.

FIG. 4C illustrates yet another flow diagram of a vehicle sensor data collection process, according to example embodiments. Referring to FIG. 4C, the process 470 includes one or more of transmitting sensor data from at least one sensor of a transport to a server 472, comparing the sensor data to one or more predetermined vehicle operation thresholds 474. Examples of thresholds may include velocity thresholds, accelerometer position thresholds, temperature thresholds, vehicle traffic thresholds, collision and/or impact thresholds, weather condition thresholds, a number of passengers detected threshold, etc. When one or more of those thresholds are exceeded, the vehicle may be modified, especially when the vehicle is an autonomous vehicle which operates without a driver. The method may also include performing an action via the server based on the comparing of the sensor data to the one or more predetermined vehicle operation thresholds 476 and transmitting the action to the transport to modify an operational status of the transport 478, such as slowing down the transport, via a signal sent to the transport, stopping the transport, altering a course of the transport, pulling-over the transport off the road, etc.

Figure 4D:
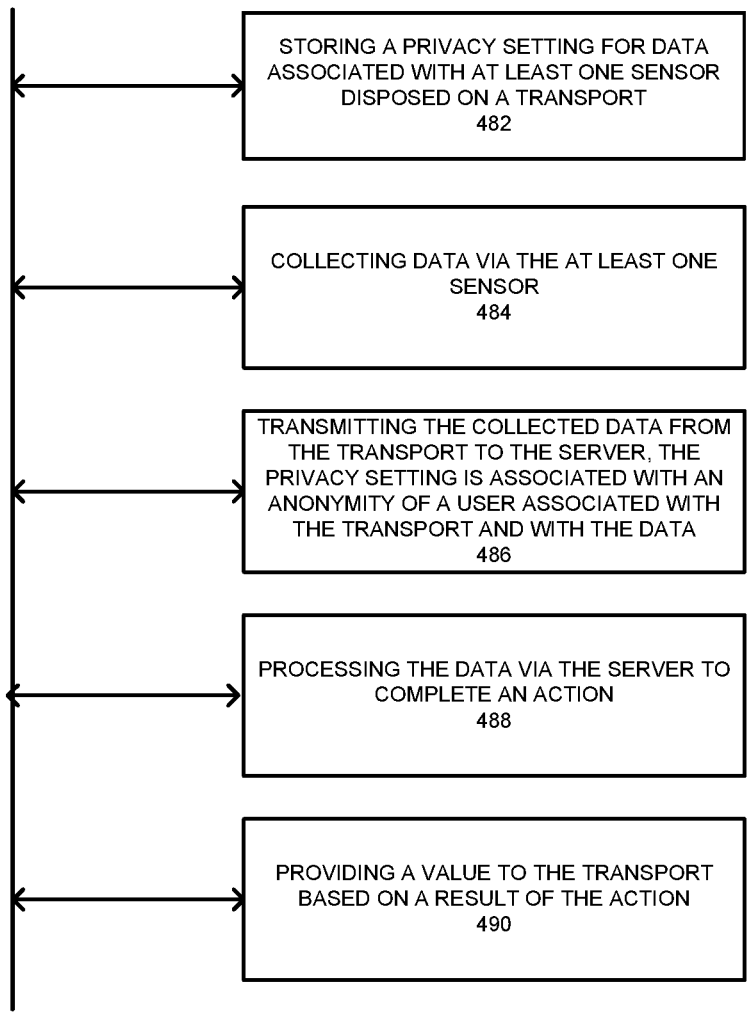
FIG. 4D illustrates yet further flow diagram of a transport sensor data collection process, according to example embodiments.

FIG. 4D illustrates yet another flow diagram of a vehicle sensor data collection and verification system, according to example embodiments. Referring to FIG. 4D, the process 480 includes one or more of storing a privacy setting for data associated with at least one sensor disposed on a transport 482. The privacy setting may include a designation to permit sharing of the sensor data, not permit sharing, share only portions of the sensor data, such as data from certain sensors related to vehicle behavior (e.g., performance, conditions, etc.), or, data related to a user's actions, such as driving style, control selections (e.g., radio stations, Internet usage, etc.). The method may also include collecting data via the at least one sensor 484 and transmitting the collected data from the transport to the server, and the privacy setting is associated with an anonymity of a user associated with the transport and with the data 486. The privacy setting may specify sharing but may maintain the user actions and/or profile as private or anonymous. The method may also include processing the data via the server to complete an action and providing a value to the transport based on a result of the action 490. The data may be identified as a certain sensor type which qualifies as sensor data category or set of data that is identifiable in a VDRs profile. Those identifiable sensor data sets may require a certain number of sensor readings over a certain period time prior to satisfying a data set requirement, also, the category, which identifies the sensor used or sensor actions collected, may also be identifiable in the VDR selections of a VDR profile(s).

Figure 4E:
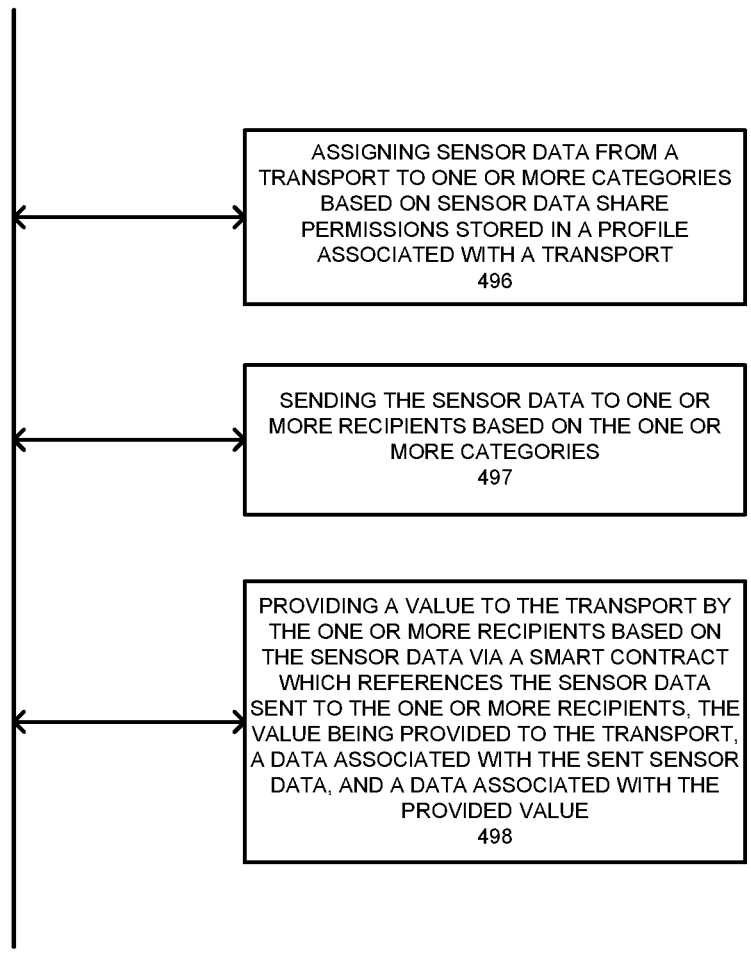
FIG. 4E illustrates yet another flow diagram of a transport sensor data collection process, according to example embodiments.

FIG. 4E illustrates yet another flow diagram of a vehicle sensor data collection and verification system, according to example embodiments. Referring to FIG. 4E, the process 495 includes one or more of assigning sensor data from a transport to one or more categories based on sensor data share permissions stored in a profile associated with a transport 496. The sensor data is then sent to one or more recipients based on the one or more categories 497. Finally, a value is provided to the transport by the one or more recipients based on the sensor data via a smart contract which references the sensor data sent to the one or more recipients, the value being provided to the transport, a data associated with the sent sensor data, and a data associated with the provided value 498.

Figure 4F:
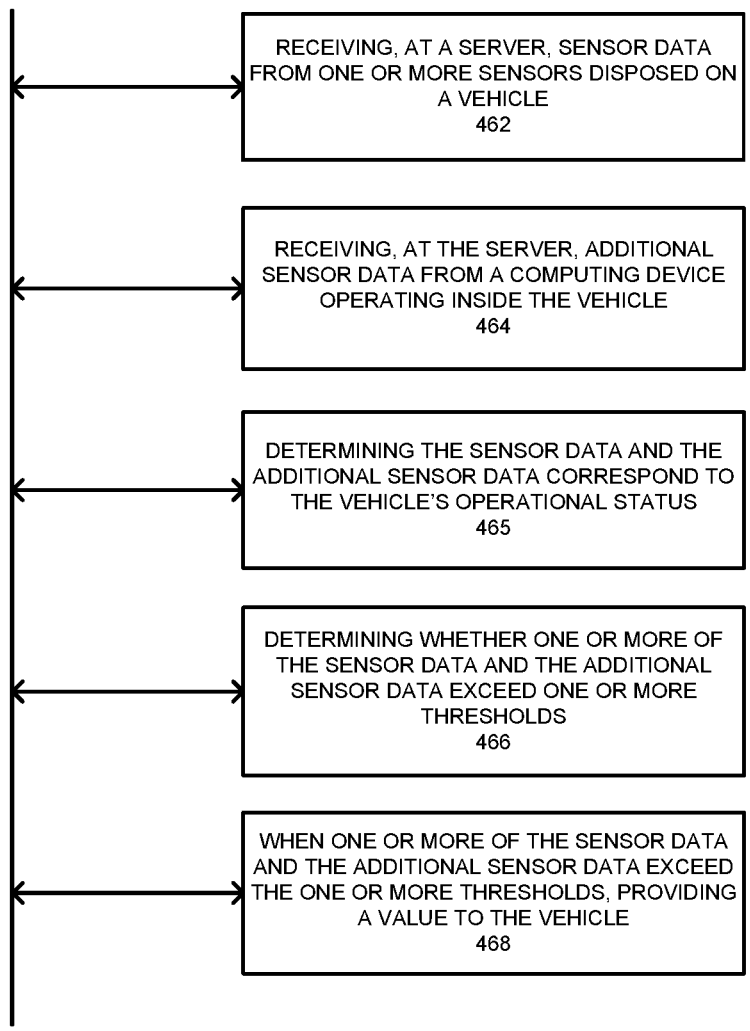
FIG. 4F illustrates yet still another flow diagram of a transport sensor data collection process, according to example embodiments.

FIG. 4F illustrates still yet another transport event condition monitoring configuration, according to example embodiments. Referring to FIG. 4F, the process 460 may include receiving, at a server, sensor data from one or more sensors disposed on a vehicle 462, receiving, at the server, additional sensor data from a computing device operating inside the vehicle 464, determining the sensor data and the additional sensor data correspond to the vehicle's operational status 465, determining whether one or more of the sensor data and the additional sensor data exceed one or more thresholds 466 and when one or more of the sensor data and the additional sensor data exceed the one or more thresholds, providing a value to the vehicle 468.

The process may also include invoking, responsive to the sensor data or the additional sensor data being identified, a smart contract, wherein the smart contract comprises at least a portion of a vehicle profile associated with the vehicle, a sensor data recipient profile, a type of sensor data associated with the vehicle profile and the recipient profile, and the value assigned to the vehicle, and responsive to invoking the smart contract, creating a distributed ledger transaction which comprises a record of the sensor data that was shared with one or more data recipients, the value assigned to the vehicle, a date of the distributed ledger transaction, and the distributed ledger transaction being logged in a distributed ledger.

Figure 5A:
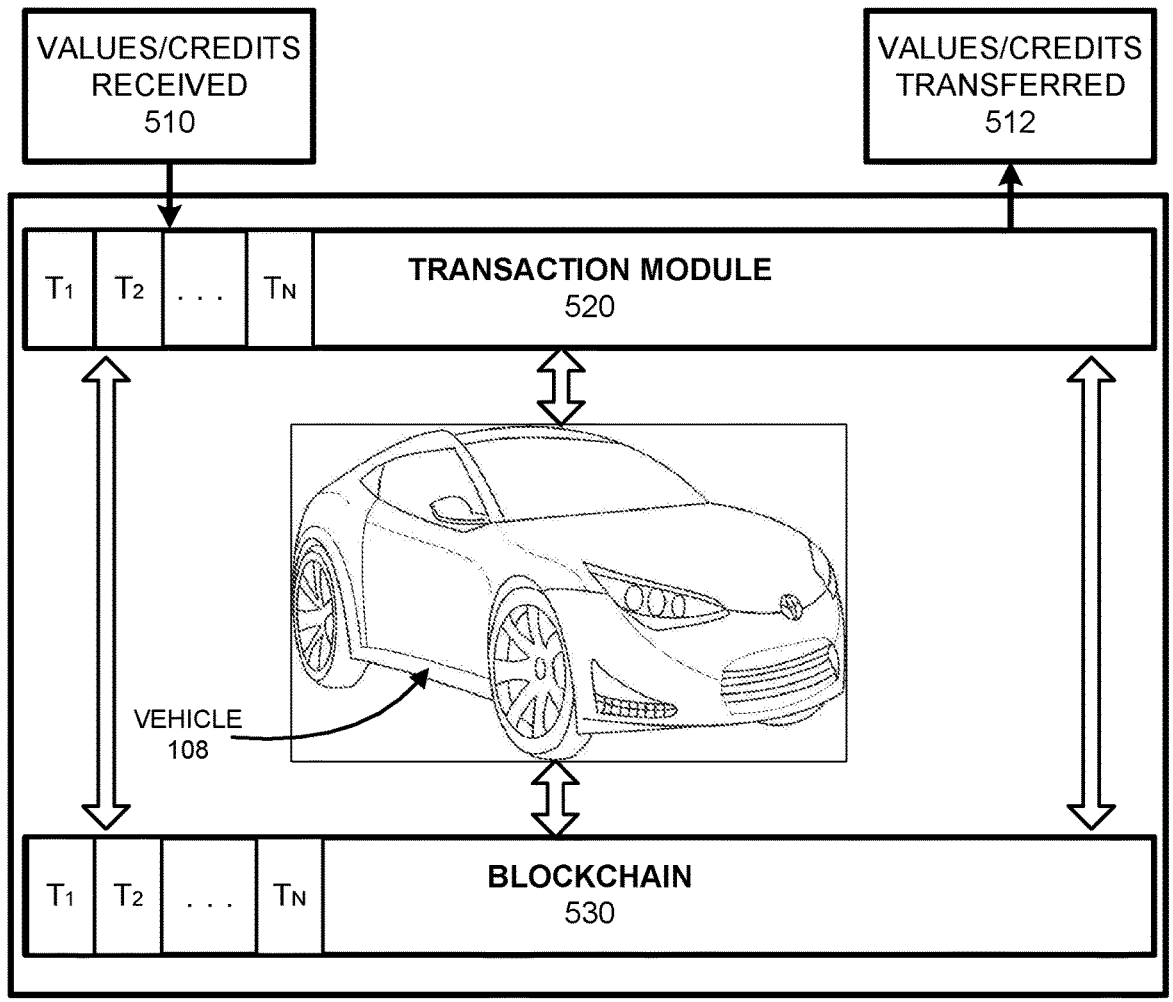
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 108 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 108.

Figure 5B:
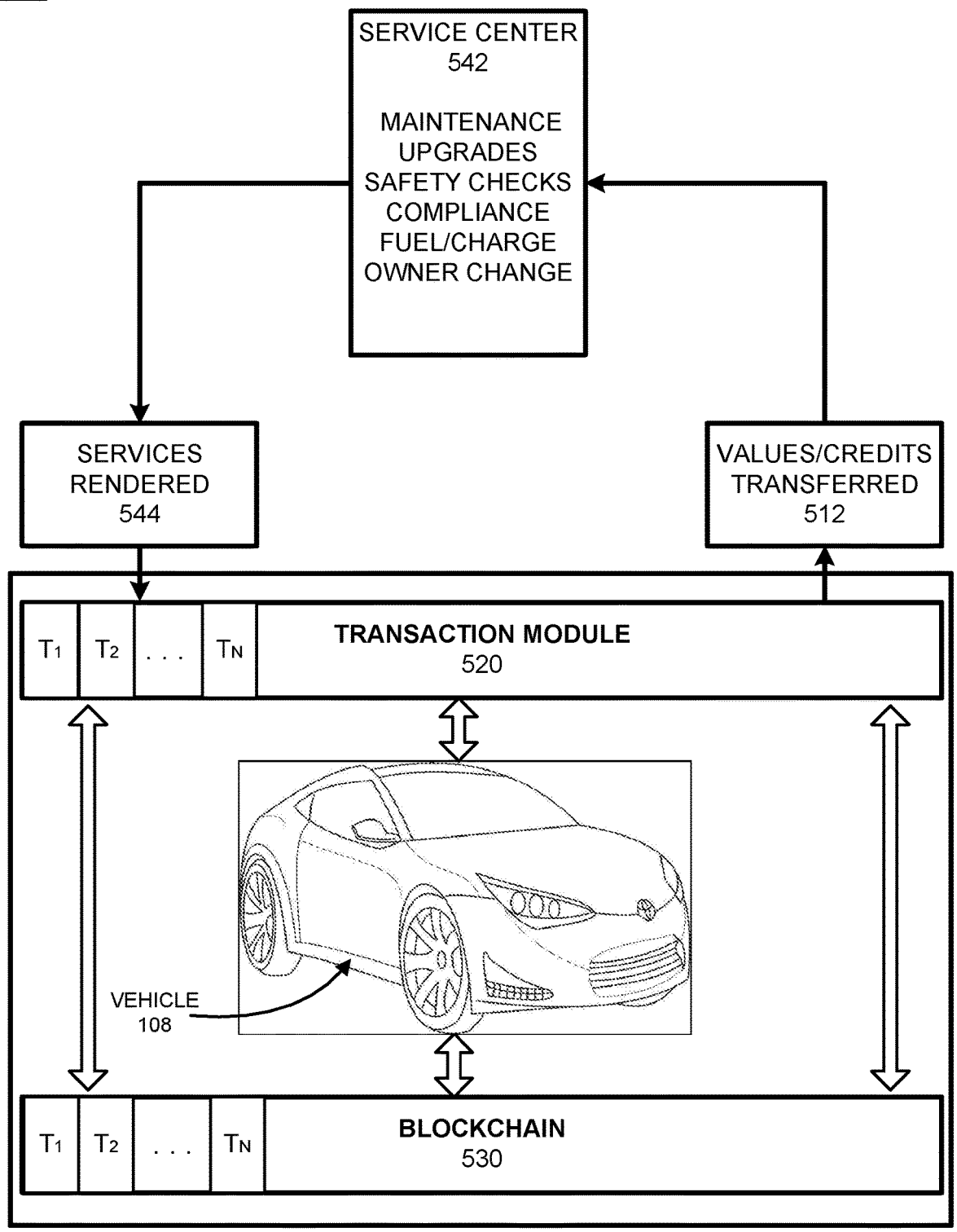
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 108 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge or replacement, tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 108 and/or the service center 542.

Figure 5C:
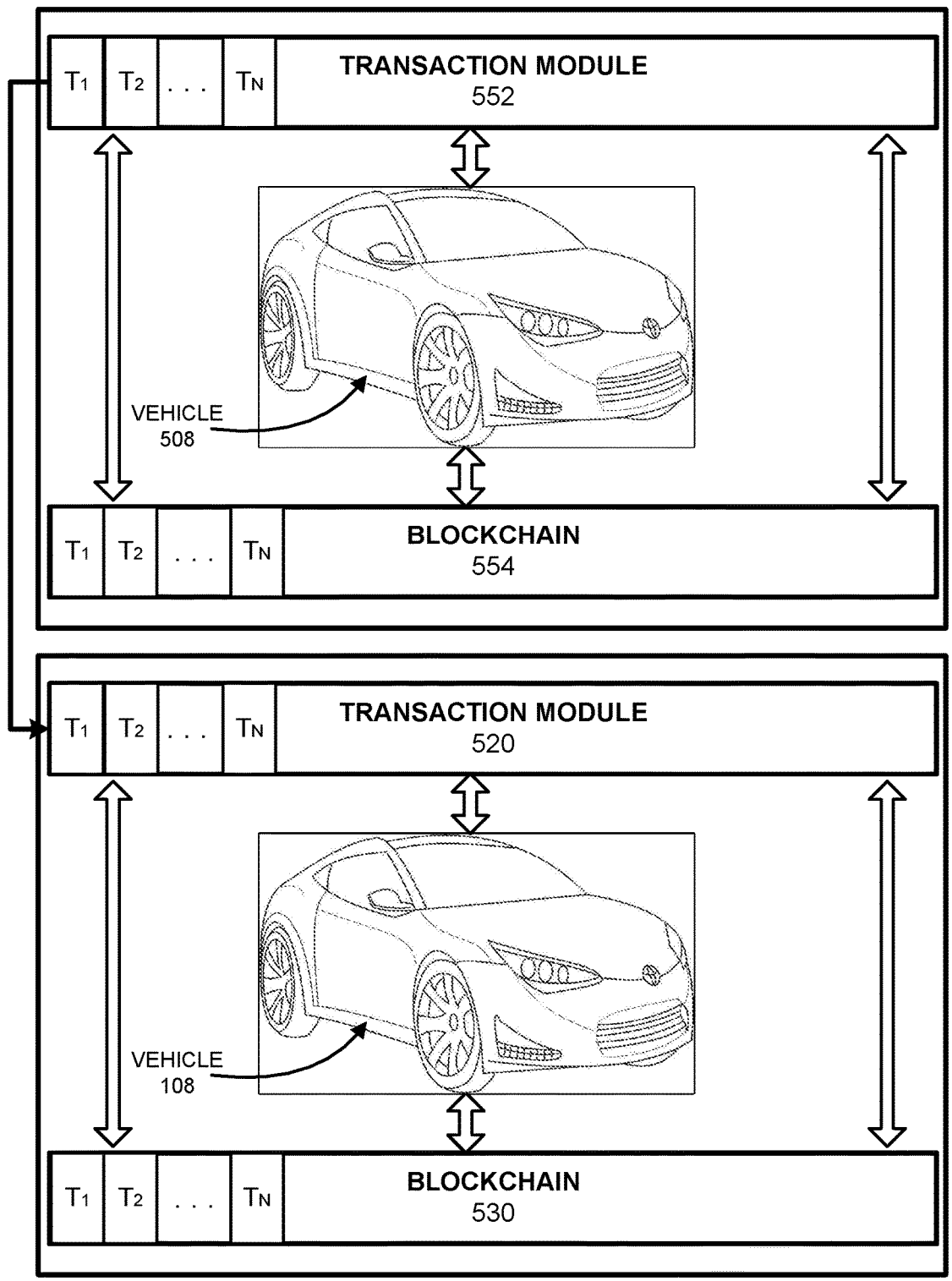
FIG. 5C illustrates a further example blockchain transport configuration, according to example embodiments.

FIG. 5C illustrates an example blockchain vehicle configuration 550 for managing blockchain transactions conducted among various vehicles, according to example embodiments. The vehicle 108 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 108 which is in its network and which operates on its blockchain member service. The vehicle 108 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 108 and the record of the transferred service is logged in the blockchain 530/ 554 assuming that the blockchains are different from one another, or, are logged in the same blockchain used by all members.

In one embodiment, the transport is configured to pay without oversight and/or approval from a user or administrator. Also, the transport can be paid as well as a user or users within the transport for sharing information from one or more devices (example: mobile phone, smart watch, activity tracker, etc.) operating within an/or near the transport. This "overlay" of information can be sent to the server and monetized in a steady and/or dynamic nature.

Figure 6:
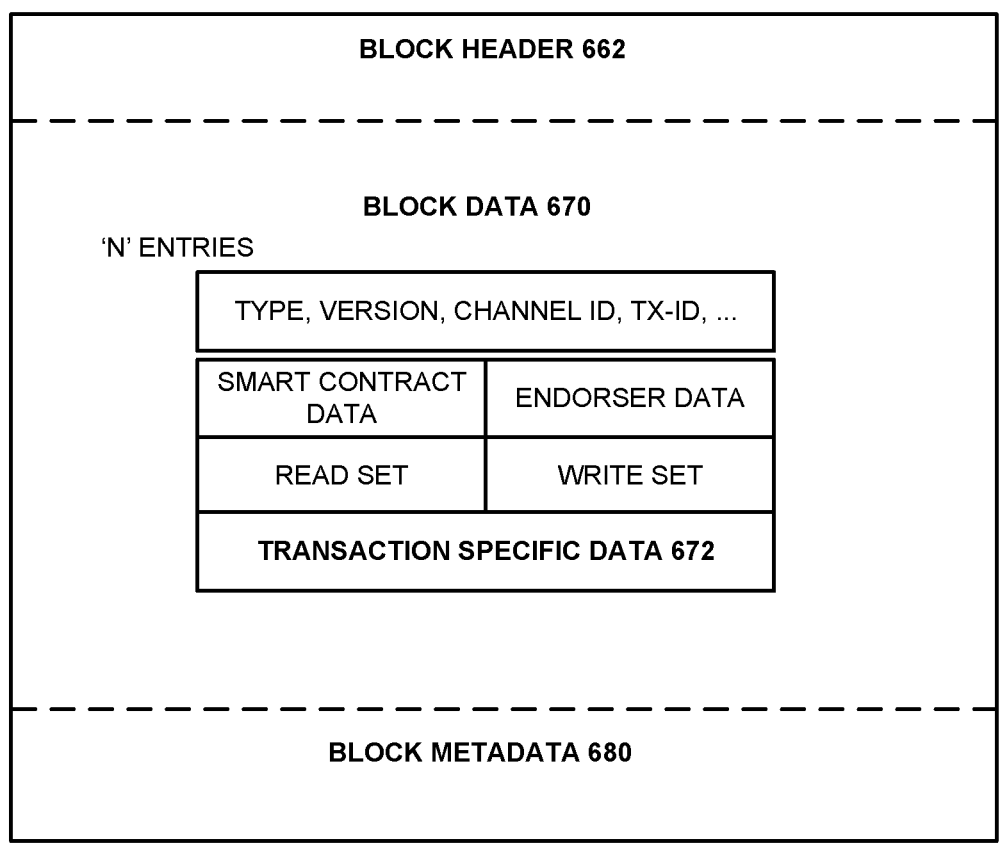
FIG. 6 illustrates an example data block, according to example embodiments.

FIG. 6 illustrates a blockchain block 600 that can be added to a distributed ledger, according to example embodiments, and contents of a block structure 660. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 660 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
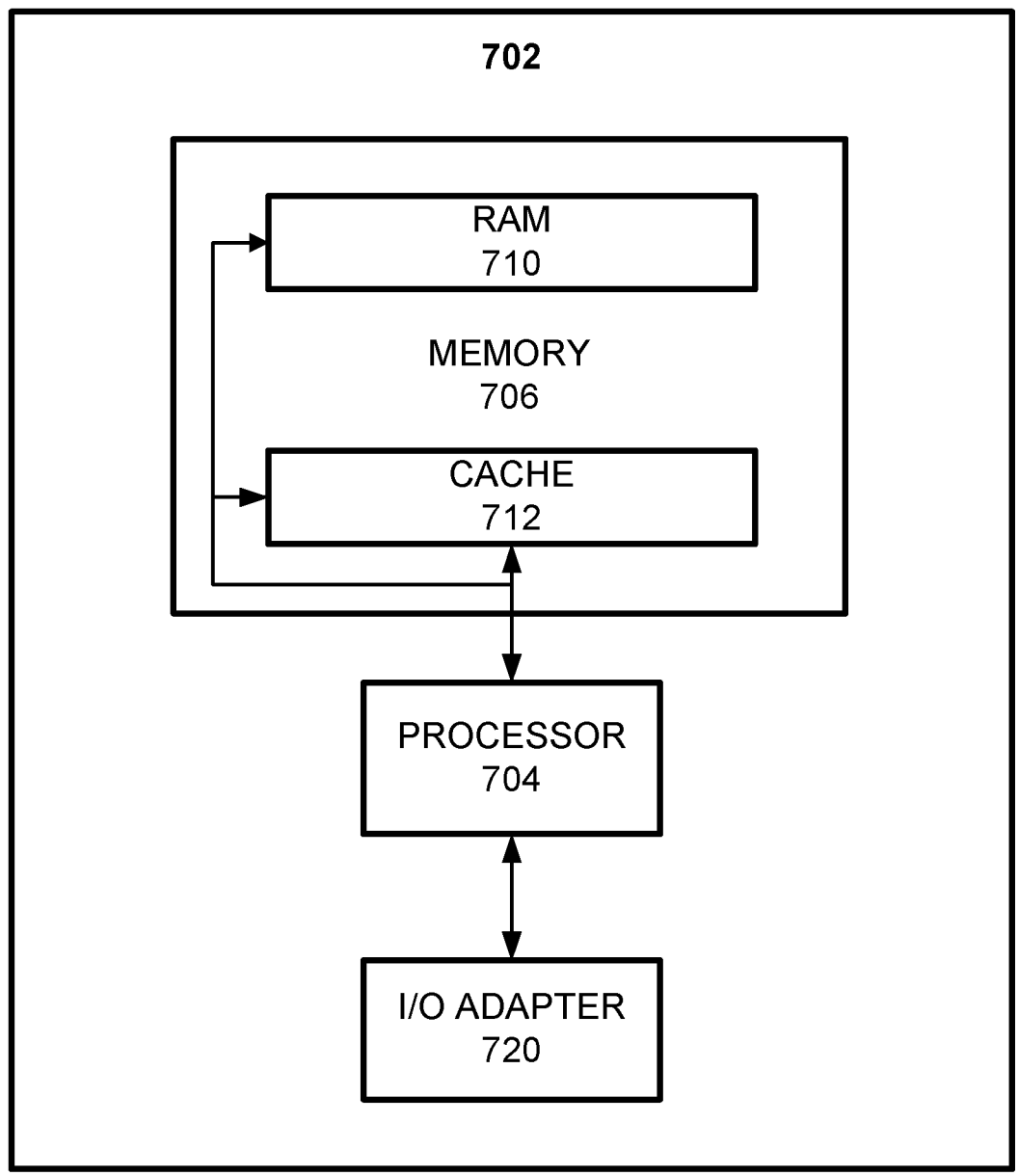
FIG. 7 illustrates an example system that supports one or more of the example embodiments.

FIG. 7 is not intended to suggest any limitation as to the scope of use or functionality of embodiments of the application described herein. Regardless, the computing node 800 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via a I/O adapter 720, such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces of the adapter 720. Still yet, computer system/server 702 can communicate with one or more networks such as a local area network (LAN), a general wide area network (WAN), and/or a public network (e.g., the Internet) via network adapter. As depicted, adapter 720 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, at a server, sensor data from one or more sensors disposed on a vehicle;
   receiving, at the server, additional sensor data from a computing device operating inside the vehicle;
   determining the sensor data and the additional sensor data correspond to the vehicle's operational status;
   determining whether one or more of the sensor data and the additional sensor data exceed one or more thresholds; and
   when one or more of the sensor data and the additional sensor data exceed the one or more thresholds, providing a value to the vehicle.

2. The method of claim 1, wherein determining the sensor data and the additional sensor data correspond to the vehicle's operational status further comprises:
   determining the sensor data has identified an abnormal movement of the vehicle while the vehicle is being operated;
   determining the additional sensor data has identified the abnormal movement of the vehicle;
   comparing a time the sensor data was captured and a time the additional sensor data was captured; and
   when the time the sensor data was captured and the time the additional sensor data was captured are within a predefined time range of one another, designating the sensor data and the additional sensor data correspond to the vehicle's operational status.

3. The method of claim 1, wherein determining the sensor data and the additional sensor data correspond to the vehicle's operational status further comprises:
   determining the sensor data has identified an abnormal condition of the vehicle while the vehicle is being operated;
   determining the additional sensor data has identified the abnormal condition of the vehicle;
   comparing a magnitude of the sensor data and a magnitude of the additional sensor data; and
   when the magnitude of the sensor data and the magnitude of the additional sensor are within a predefined range of one another, designating the sensor data and the additional sensor data correspond to the vehicle's operational status.

4. The method of claim 1, wherein the sensor data is one or more of movement data, audio data, and video data; and the additional sensor data is one or more of orientation data, angular velocity date, location, speed, direction.

5. The method of claim 1, wherein the one or more sensors comprise movement sensors, sonar sensors, accelerometers, temperature sensors, speed sensors, sound sensors, collision sensors, tire pressure sensors, location determination sensors, camera sensors, activity sensors, and biometric sensors.

6. The method of claim 1, further comprising:
   invoking, responsive to the sensor data or the additional sensor data being identified, a smart contract, wherein the smart contract comprises at least a portion of a vehicle profile associated with the vehicle, a sensor data recipient profile, a type of sensor data associated with the vehicle profile and the recipient profile, and the value assigned to the vehicle.

7. The method of claim 6, wherein responsive to invoking the smart contract, creating a distributed ledger transaction which comprises a record of the sensor data that was shared with one or more data recipients, the value assigned to the vehicle, a date of the distributed ledger transaction, and the distributed ledger transaction being logged in a distributed ledger.

8. A system, comprising:
   a vehicle;
   a computing device operating inside the vehicle; and
   a server configured to
      receive sensor data from one or more sensors disposed on the vehicle;
      receive additional sensor data from the computing device operating inside the vehicle;
      determine the sensor data and the additional sensor data correspond to the vehicle's operational status;

determine whether one or more of the sensor data and the additional sensor data exceed one or more thresholds; and when one or more of the sensor data and the additional sensor data exceed the one or more thresholds, provide a value to the vehicle.

9. The system of claim 8, wherein the sensor data and the additional sensor data are determined to correspond to the vehicle's operational status by the server further being configured to determine the sensor data has identified an abnormal movement of the vehicle while the vehicle is being operated;

determine the additional sensor data has identified the abnormal movement of the vehicle;

compare a time the sensor data was captured and a time the additional sensor data was captured; and when the time the sensor data was captured and the time the additional sensor data was captured are within a predefined time range of one another, designate the sensor data and the additional sensor data correspond to the vehicle's operational status.

10. The system of claim 8, wherein the sensor data and the additional sensor data are determined to correspond to the vehicle's operational status by the server further being configured to determine the sensor data has identified an abnormal condition of the vehicle while the vehicle is being operated;

determine the additional sensor data has identified the abnormal condition of the vehicle;

compare a magnitude of the sensor data and a magnitude of the additional sensor data; and when the magnitude of the sensor data and the magnitude of the additional sensor are within a predefined range of one another, designate the sensor data and the additional sensor data correspond to the vehicle's operational status.

11. The system of claim 8, wherein the sensor data is one or more of movement data, audio data, and video data; and the additional sensor data is one or more of orientation data, angular velocity date, location, speed, direction.

12. The system of claim 8, wherein the one or more sensors comprise movement sensors, sonar sensors, accelerometers, temperature sensors, speed sensors, sound sensors, collision sensors, tire pressure sensors, location determination sensors, camera sensors, activity sensors, and biometric sensors.

13. The system of claim 8, wherein the server is further configured to invoke, responsive to the sensor data or the additional sensor data being identified, a smart contract, wherein the smart contract comprises at least a portion of a vehicle profile associated with the vehicle, a sensor data recipient profile, a type of sensor data associated with the vehicle profile and the recipient profile, and the value assigned to the vehicle.

14. The system of claim 13, wherein responsive to the smart contract being invoked, the server is further configured to create a distributed ledger transaction which comprises a record of the sensor data that was shared with one or more data recipients, the value assigned to the vehicle, a date of the distributed ledger transaction, and the distributed ledger transaction being logged in a distributed ledger.

15. A non-transitory computer readable storage medium configured to store instructions that when executed cause a processor to perform:

receiving, at a server, sensor data from one or more sensors disposed on a vehicle;

receiving, at the server, additional sensor data from a computing device operating inside the vehicle;

determining the sensor data and the additional sensor data correspond to the vehicle's operational status;

determining whether one or more of the sensor data and the additional sensor data exceed one or more thresholds; and when one or more of the sensor data and the additional sensor data exceed the one or more thresholds, providing a value to the vehicle.

16. The non-transitory computer readable storage medium of claim 15, wherein the determining the sensor data and the additional sensor data correspond to the vehicle's operational status further comprises:

determining the sensor data has identified an abnormal movement of the vehicle while the vehicle is being operated;

determining the additional sensor data has identified the abnormal movement of the vehicle;

comparing a time the sensor data was captured and a time the additional sensor data was captured; and when the time the sensor data was captured and the time the additional sensor data was captured are within a predefined time range of one another, designating the sensor data and the additional sensor data correspond to the vehicle's operational status.

17. The non-transitory computer readable storage medium of claim 15, wherein determining the sensor data and the additional sensor data correspond to the vehicle's operational status further comprises:

determining the sensor data has identified an abnormal condition of the vehicle while the vehicle is being operated;

determining the additional sensor data has identified the abnormal condition of the vehicle;

comparing a magnitude of the sensor data and a magnitude of the additional sensor data; and when the magnitude of the sensor data and the magnitude of the additional sensor are within a predefined range of one another, designating the sensor data and the additional sensor data correspond to the vehicle's operational status.

18. The non-transitory computer readable storage medium of claim 15, wherein the sensor data is one or more of movement data, audio data, and video data; and the additional sensor data is one or more of orientation data, angular velocity date, location, speed, direction.

19. The non-transitory computer readable storage medium of claim 15, wherein the one or more sensors comprise movement sensors, sonar sensors, accelerometers, temperature sensors, speed sensors, sound sensors, collision sensors, tire pressure sensors, location determination sensors, camera sensors, activity sensors, and biometric sensors.

20. The non-transitory computer readable storage medium of claim 15, wherein the processor is further configured to perform:

invoking, responsive to the sensor data or the additional sensor data being identified, a smart contract, wherein the smart contract comprises at least a portion of a vehicle profile associated with the vehicle, a sensor data recipient profile, a type of sensor data associated with the vehicle profile and the recipient profile, and the value assigned to the vehicle.

* * * * *